United States Patent [19]

Kitterman

[11] 4,078,821
[45] Mar. 14, 1978

[54] UTILITY TRAILER

[76] Inventor: Lawrence P. Kitterman, 7112 Joe Will, Grapevine, Tex. 76051

[21] Appl. No.: 654,552

[22] Filed: Feb. 2, 1976

[51] Int. Cl.² .............................................. B60D 1/00
[52] U.S. Cl. ................................. 280/460 R; 280/78; 280/179 B; 280/401; 280/490 R; 403/45; 403/118; 403/343
[58] Field of Search ............ 280/78, 292, 402, 460 R, 280/490 R, 179 R, 179 A, 179 B, 401, 106 T; 224/29 R, 42.45 R, 42.03 B; 296/35 A; 214/450; D12/101, 158; 403/118, 343, 41, 45, 46

[56] References Cited
U.S. PATENT DOCUMENTS

| D. 226,655 | 4/1973 | Ezell ................................. D12/101 |
| 1,160,079 | 11/1915 | Hunter ............................ 280/292 X |
| 2,057,655 | 10/1936 | Anthony et al. ................... 280/78 X |
| 2,256,038 | 9/1941 | Woodruff ..................... 280/460 R X |
| 2,846,264 | 8/1958 | Loomis ............................. 296/35 A |
| 3,387,859 | 6/1968 | McClellan ......................... 280/78 X |
| 3,516,696 | 6/1970 | Kaim ................................ 403/118 X |
| 3,528,578 | 9/1970 | Schoenberger ..................... 214/450 |
| 3,734,540 | 5/1973 | Thiermann ................. 280/490 R X |
| 3,923,220 | 12/1975 | Marcyan ....................... 224/42.03 B |

FOREIGN PATENT DOCUMENTS

| 97,617 | 12/1939 | Sweden ......................... 224/42.03 B |
| 463,641 | 4/1937 | United Kingdom ................... 280/78 |

Primary Examiner—Joseph F. Peters, Jr.
Assistant Examiner—Michael J. Forman
Attorney, Agent, or Firm—Wofford, Felsman, Fails & Zobal

[57] ABSTRACT

A utility trailer for towing behind a vehicle, for uses such as carrying a motorcycle. The frame is rectangular and comprised of tubular members, with longitudinal channels on top of the tubular members for receiving motorcycle wheels. A detachable castor wheel supports the frame and is connected to it by means of leaf springs attached to the wheel on opposite sides. Two hitches for connecting the trailer to a vehicle are spaced apart on the forward end of the frame. Each hitch has two tabs, one connected to the vehicle and one to the frame that are coupled together by a pin. The hitch portion that is connected to the frame is L-shaped so that it can be inverted to change the height for different vehicle sizes. The mounting system for securing motorcycles includes a pair of telescoping tubes that are threaded together so that their combined length may be varied. The tubes have eyes attached to opposite ends with self-aligning bearings for insertion over pins that are connected to the motorcycle and to the frame.

11 Claims, 9 Drawing Figures

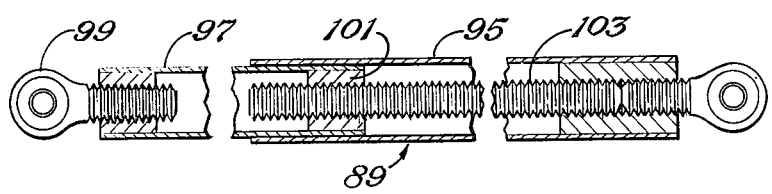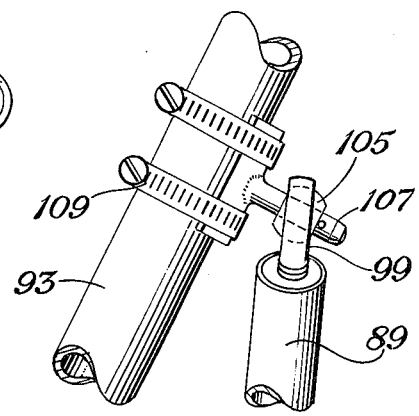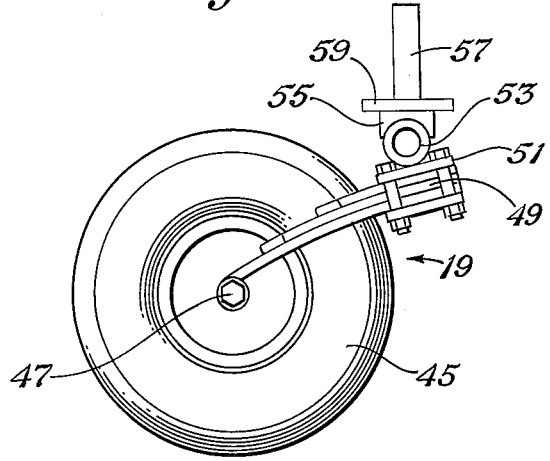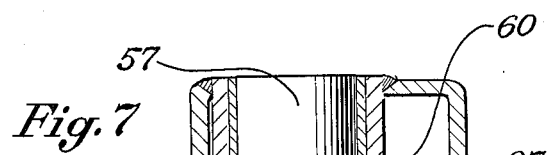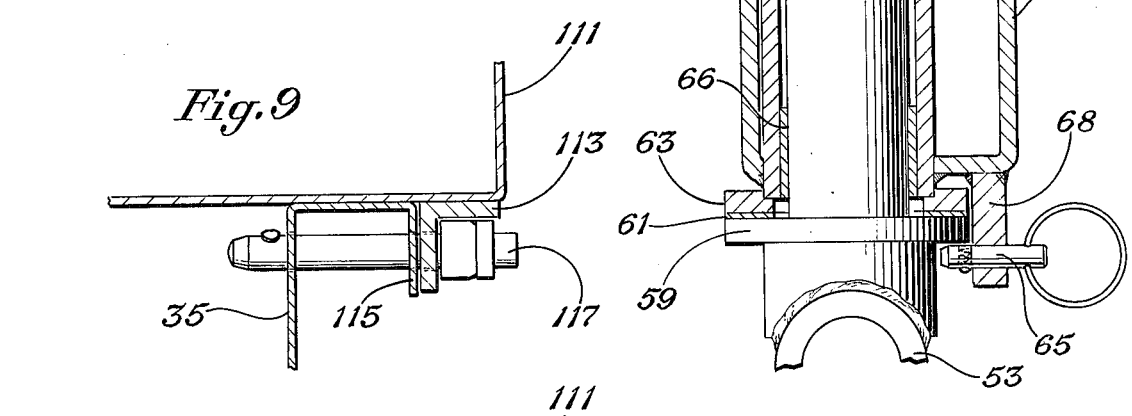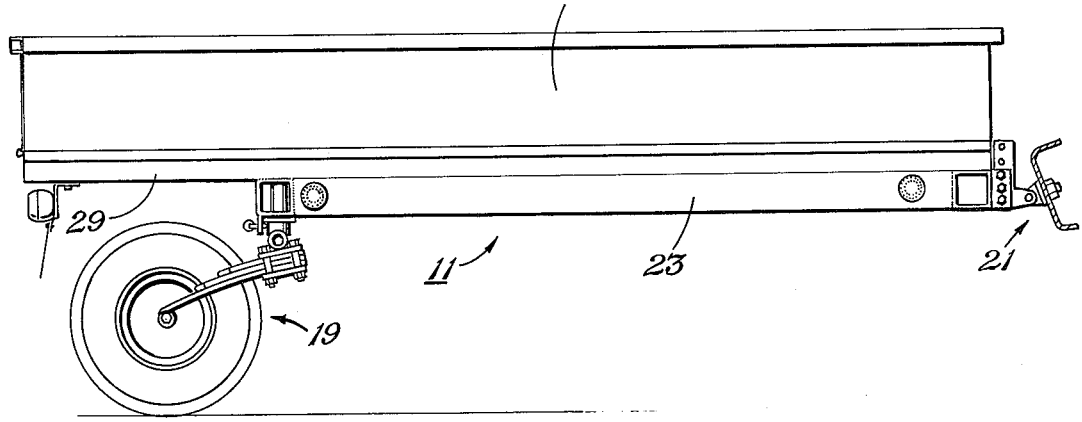

UTILITY TRAILER

BACKGROUND OF THE INVENTION

1. Field of the Invention:

This invention relates in general to trailers and in particular to a trailer for carrying motorcycles and other lightweight uses.

2. Description of the Prior Art:

Various trailer designs for lightweight uses such as carrying motorcycles and light hauling are known. These trailers, designed to be towed behind an automobile or a pick-up truck, normally are of a two-wheel design with a box bed mounted on the axle between the wheels and a single point hitch. There are several disadvantages with this type of trailer. They are difficult to back, and are subject to "jackknifing" while pulled at high speeds on a highway. They require a large storage space also.

Another type of trailer known in the art uses a single castor wheel that swivels. The frame of the trailer is connected to the vehicle at two points by pinned hitches that prevent the trailer from moving in lateral directions. Various collapsible designs are shown in the U.S. Pat. No. 2,509,794 issued to Anderson, U.S. Pat. No. 2,691,546 issued to Torrance, and others. The advantages of these type of trailers is that they are easy to back since they are in rigid alignment with the car, and are not subject to "jackknifing". Also the car/trailer combination is shorter in over-all length. One disadvantage is that castor wheel trailers are not designed for heavier loads such as motorcycles because of torsional forces imposed upon the frame and hitches, particularly upon uneven roadways. Also the castor wheels tend to shimmy at high speeds, therefore require dampers or other means to prevent shimmying. While disconnected, the castor wheel trailers are difficult to control when pushing by hand. It is also difficult for one person to hitch a castor wheel trailer to a vehicle acting alone since holes must be aligned on both sides of the trailer and pins inserted therethrough.

One disadvantage with motorcycle trailers is that they are not adaptable for other uses. Also the motorcycles are conventionally mounted to the trailer by depressing the cycle suspension system and connecting straps to the handlebars of the cycle. This is an unwieldy operation. Also since the cycle suspension is under compression, vibration forces not absorbed by the trailer suspension system, which may be quite stiff, will be transmitted directly to the rigid motorcycle.

SUMMARY OF THE INVENTION

A general object of this invention is to provide an improved utility trailer.

Another object is to provide an improved castor wheel trailer that is convertible to various uses, is easily disassembled into components that can be carried by hand, and requires little storage space.

Another object is to provide an improved lightweight castor wheel trailer for carrying motorcycles.

Another object is to provide an improved castor wheel assembly that is detachable, and that resists shimmying at high speeds without using a damper.

Another object is to provide a two-point hitch for a castor wheel trailer that is adjustable for various vehicle bumper heights, and that allows the trailer to be easily hitched to a vehicle by only one person.

Another object is to provide an improved mounting system for a motorcycle on a utility trailer so that the suspension of the cycle is not in compression while secured to the trailer, yet the motorcycle remains securely upright.

In accordance with these objects, a utility trailer of the castor wheel type is provided that utilizes a rectangular tubular frame. Channel members are mounted to the top of the longitudinal members of the frame for receiving a motorcycle. The castor wheel is detachable and carries the frame of the trailer by means of two leaf springs that are spaced apart with the wheel inserted between. A pin-type hitch is mounted on each side of the forward end of the frame. The portion of the hitch attached to the frame is L-shaped so that it may be inverted for coupling with vehicles of different heights. Notches are spaced adjacent the apertures in the tabs of the hitch. These notches bear against the pin inserted through the other portion of the hitch for holding the trailer in close alignment while the user couples the other hitch. The mounting system includes a pair of telescoping tubes that are threaded together to vary their length. The tubes are connected between the frame and the motorcycle at the desired spacing. Each end of the tube assembly has an eye with a self-aligning bearing that inserts over pins on the frame and on the motorcycle provided therefor. A rectangular box bed may be placed on top of the channel members and pinned thereto for other uses. The trailer may be easily disassembled into two component parts for carrying by hand.

These and other objects are affected by my invention as will be apparent from the following description taken in accordance with accompanying drawings.

BRIEF DESCRIPTION OF THE DRAWINGS

FIG. 4 is an enlarged partial vertical cross-sectional view of the tie-down bar shown in FIG. 1.

FIG. 5 is an enlarged view of the upper end of the tie-down bar of FIG. 4 showing how it is connected to the motorcycle.

FIG. 6 is an enlarged side elevational view of the castor wheel shown in FIG. 1.

FIG. 7 is an enlarged partial cross-sectional view of the swivel of the castor wheel of FIG. 6.

FIG. 8 is a side elevational view of the trailer of FIG. 1 showing a box bed placed thereon.

FIG. 9 is an enlarged partial vertical cross-sectional view of the box bed of FIG. 8.

DESCRIPTION OF THE PREFERRED EMBODIMENT

Figures 1, 2, 3:
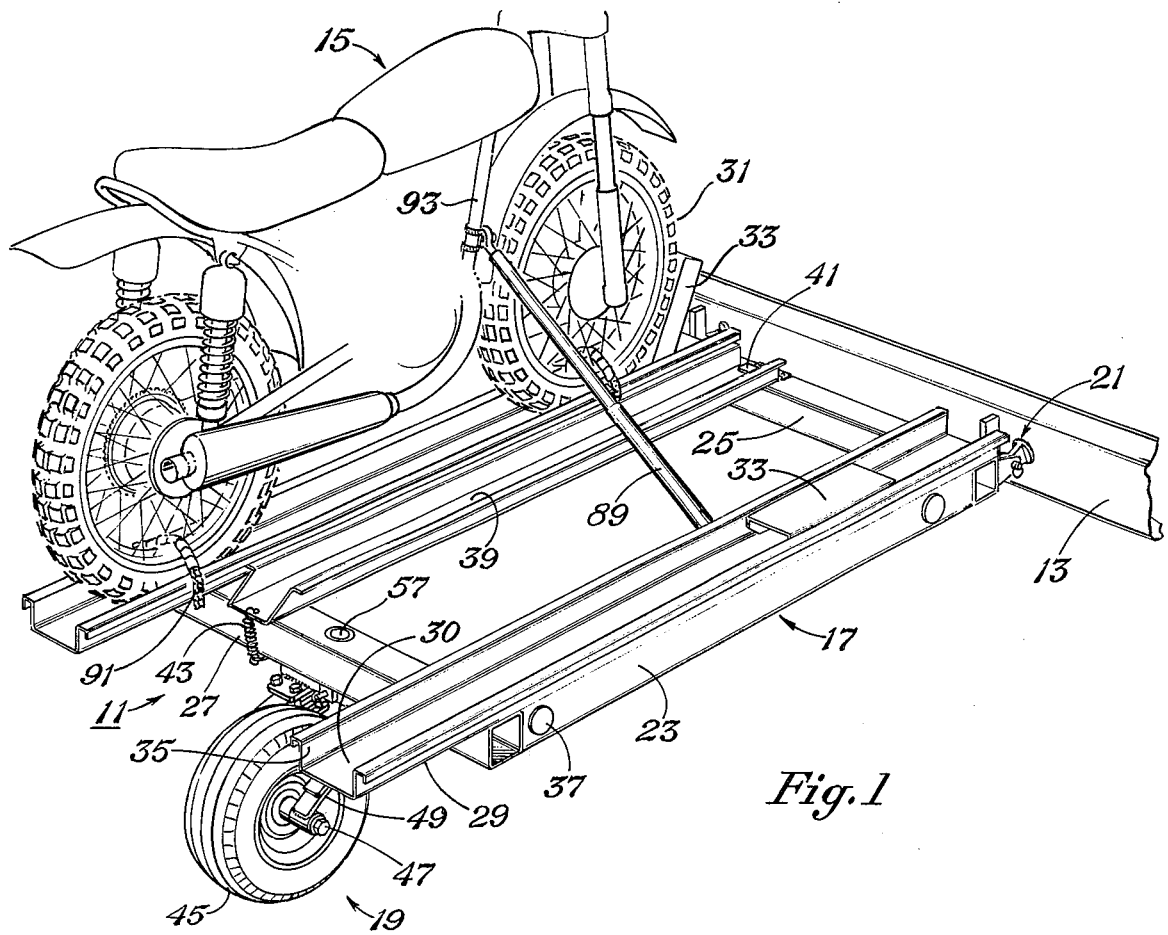
FIG. 1 is a perspective view of the trailer in accordance with this invention with portions of a motorcycle and a vehicle shown.
FIG. 2 is an enlarged top partial plan view of the forward portion of the trailer of FIG. 1.
FIG. 3 is a side elevational view of FIG. 2.

Referring to FIG. 1, a vehicle trailer 11 is shown attached to a vehicle bumper 13. A motorcycle 15 is mounted on one side of the vehicle trailer.

The vehicle trailer 11 is comprised of a frame 17, castor wheel assembly 19 and hitch means 21. The frame 17 is rectangular and comprised of tubular members to add strength to the trailer while retaining relatively light weight. Longitudinal tubular members 23 extend parallel to the longitudinal axis of the vehicle and are spaced apart and connected together by forward and rearward lateral tubular members 25, 27. These tubular members are square in section; however other configurations, such as circular, could be used as well.

A pair of channel members 29 are welded directly to the top of the longitudinal members. In order to reduce weight, preferably the lower surface 30 of channel member 29 defines the upper surface of a longitudinal member 23. Consequently prior to welding the channel member to the longitudinal tubular member, the tubular member itself is open-topped, or a channel-type member. Channel members 29 extend from the forward lateral tubular member to a selected distance past the rearward lateral tubular member. The width of the channel members 29 must be sufficient to receive the wheel 31 of a motorcycle.

Wheel stops 33 are pivotally mounted within the channel members 29 adjacent the forward end of the trailer. Each wheel stop 33 is a short channel section slightly smaller in width than channel member 29 and having one end pinned or bolted pivotally to the sides 35 of the channel members 29. The wheel stop 33 adjacent the motorcycle 15 as shown in the drawing is in the upper position, while the wheel stop on the opposite side is in its retracted position. In the retracted position, the channel of the wheel stop faces downward, and the channel surface is flush with the top of sides 35. While in the retracted position, a box bed may be placed on the bed, as is later described. The frame includes light reflectors 37 for safety purposes. A loading ramp 39 may be stored on the frame and retained by clip 41 and spring 43.

The frame 17 is suspended at its rearward end by the castor wheel assembly 19. Referring to FIGS. 6 and 7, the castor wheel assembly includes a pneumatic tire 45 journalled on an axle 47. One end of a leaf spring assembly 49 is attached to axle 47. Leaf spring assembly 49 is preferably comprised of three leaves of the conventional bow-type as used in vehicles. Each leaf, however, is cut in half and bolted together by bolt assembly 51 adjacent the cut end. The tire 45 extends between the springs, with the springs perpendicular to the axle 47, and the "bow" facing downward. A pipe 53 is welded between each bolt assembly 51. The shaft 55 is welded in the center of the bolt and faces upwardly. Shaft 55 has a reduced portion 57 at the base of which is a flange 59. The reduced portion 57 is received within a cylindrical receptacle 60 welded in the center of the rearward lateral tubular member. Flange 59 bears against an oiless thrust washer 61 and load washer 63. Oiless bushings 66 are pressed within receptacle 60 to reduce wear on the receptacle. The washers 61 and 63 are adhered to the frame so as to prevent inadvertant removal after disengagement of the wheel assembly. A pin 65 is mounted on a flange 68 extending downwardly below the rearward lateral member 27 to retain the wheel assembly. Pin 65 bears against flange 59, preventing disengagement of the wheel assembly until pin 65 is removed.

Referring to FIGS. 2 and 3, the hitch means 21 is shown disengaged with bumper 13 of the vehicle. Identical hitch means 21 are located on each side of the trailer. The portion coupled to the trailer includes a bracket 67 having two flanges 69 spaced apart with a plurality of apertures 71 extending therethrough. A second bracket 73 is inserted between flanges 69 and bolted to it. The second bracket is generally L-shaped with one leg of the L having a plurality of apertures 75 for bolting to the first bracket. The other leg of the L has coupling means or tabs 77 projecting outward for engaging with the portion of the hitch that is connected with the bumper of the vehicle. The leg of bracket 75 that contains the apertures for bolting to bracket 67 is approximately the width of the tubular members. The spacing of the apertures allows it to be moved up or down to adjust to various heights or it may be inverted for further adjustment. FIG. 3 shows the bracket with the coupling means 77 in the lower position. The coupling means 77 of the bracket has a pair of tabs spaced apart with an aperture 79 passing therethrough for the insertion of pin means such as a bolt of locking pin 81. Tabs 77 also have semi-circular notches 83 on the upper and lower edges adjacent aperture 79. Notches 83 are slightly greater in diameter than pin 81, for bearing against the pin 81 while hitching the trailer to the vehicle, as will be later described.

A second coupling member or tab 85 is bolted to the bumper 13 of the vehicle. Tab 85 has an aperture 87 extending therethrough for alignment with apertures 79. The thickness of tab 85 allows it to be closely inserted between tabs 77 of the L-shaped bracket. It will be appreciated that a pair of tabs could be located on the bumper while a single tab could be connected with bracket 73, reversing the embodiment shown.

Referring to FIGS. 1, 4 and 5, the means for mounting the motorcycle releasably to the trailer includes a tie-down rod 89 and strap means 91. The strap means 91 are conventional and may take various forms. They are connected to the channel members 29 and secure the wheels 31 of the motorcycle to the channel. Preferably a chain with a quick-release mechanism is used. The tie-down bar 89 extends between a member 93 of the motorcycle frame and the opposite longitudinal tubular member 23 of the trailer.

Referring particularly to FIGS. 4 and 5, the tie-down bar is of adjustable length and comprised of a pair of tubes 95, 96 threaded to each other. An eye 99 or circular loop extends out the outer end of each tube, its threads being rigidly connected by adhesive to the tube. The eye could be welded to the tube rather than use threads and adhesive. To avoid accidental disengagement by vibration, neither eye 99 may be rotated independent of its respective tube. The inner tube 97 has a threaded portion 101 adjacent its inner end. A threaded bolt 103 is welded or secured by adhesive to the outer tube 95 and screwed into threaded portion 101. The length of the tie-bar 89 may thus be varied by rotating one tube with respect to the other tube, causing bolt 103 to move with respect to threaded portion 101. The length of inner tube 97 is selected so that a portion of bolt 103 will be showing prior to its complete disengagement from threaded portion 101, warning the user that the maximum length has been reached.

Referring to FIG. 5, each eye 99 contains a self-aligning bearing 105 that is pivotal with respect to eye 99. Pin means such as a bolt or a pin and bracket 107 is fastened by various fastener means 109 to the frame member 93 of the motorcycle. Pin 107 is located in a safe position so that it may remain permanently on the motorcycle. Eye 105 contains an aperture for receiving the pin as shown in FIG. 5. A pin (not shown) similar to pin 107 is welded or bolted to each longitudinal tubular member 23.

In operation, if the trailer is in a disassembled state, initially the frame 17 is carried by hand to the vehicle. Locking pins 81 are inserted through tabs 85 attached to the vehicle. The frame is picked up and placed over pins 81, with notches 83 bearing against the pins. The pin 81 on one side is then removed and the frame lowered until apertures 79 and 87 in the respective coupling members are aligned. The pin on that side is then inserted and the operation repeated for the other side. The castor wheel assembly is brought from its storage position to the frame, the frame lifted upward at its rearward end and the castor wheel inserted within receptacle 60. Referring to FIG. 7, pin 65 is drawn back until flange 59 bears against oiless washer 61. Pin 65 is then replaced, retaining the wheel assembly. If it is desired to carry one or more motorcycles, a loading ramp 39 may be used to roll the motorcycles in position on the channel members 29. Wheel stops 33 are pivoted into upright position. Tie bars 89 are adjusted to length and inserted over their mating pins. Strap means 91 are secured, locking the wheels of the motorcycle to the channel member.

Another use for the utility trailer is shown in FIGS. 8 and 9. A rectangular box bed 111 is placed on the channel members 29, with the wheel stops in retracted position. The box bed has flanges 113 on each longitudinal side that extend down and abut against flanges 115 of the channel members 29. A pin 117 is inserted through respective apertures, releasably coupling the box bed to the frame. Because of the strong rectangular configuration, the utility trailer could be used for other purposes as well, such as a flat bed carrier, a supporting base for a camping tent, or a hunting dog carrier.

It is accordingly seen that an invention having significant advantages has been provided. A lightweight but strong utility trailer is provided that has the advantages of castor wheel type trailers, and the strength and capacities of single-point hitch type trailers. The rectangular tubular frame is sufficiently strong to withstand torsional stresses resulting from weights up to 600 pounds or more. The two-spring castor wheel is easily detachable and resistant to shimmying at high speeds. The hitches are versatile, in that one portion may be reversed for maximum height change. The hitch also facilitates coupling the trailer to a vehicle since alignment is maintained by cooperation of the locking pin and notches. The tie-bar mounting system for the motorcycle allows the motorcycle to be quickly secured in an upright position. Compressing the suspension of the motorcycle is not required, allowing its full suspension system to be used in cooperation with the trailer suspension system to reduce vibration. The rectangular tubular frame is readily adaptable to other uses, such as a box bed, and the trailer is easily disassembled for storage purposes.

The foregoing disclosure and the showings made in the drawings are merely illustrative of the principles of this invention and are not to be interpreted in a limiting sense.

I claim:

1. In a utility trailer of the type having a frame, a castor wheel assembly attached to the rear of the frame for supporting the trailer while being towed, and a pair of hitch means mounted to the forward end of the frame for connection to a vehicle, an improved castor wheel assembly comprising:
    a wheel journalled on an axle;
    a pair of leaf springs, spaced apart with the wheel inserted therebetween, each spring perpendicular to and connected at its lower end to the axle;
    a cross member connecting the upper ends of the springs together;
    a shaft rigidly connected to the cross member and extending upwardly into a receptacle in the frame;
    a flange encircling the shaft and bearing against the rearward lateral member; and
    a pin carried by the frame transverse to the shaft and below the flange for retaining the castor wheel to the frame.

2. The apparatus according to claim 1 wherein the cross member is a tube.

3. In a trailer for carrying motorcycles of the type having a frame, a channel member mounted to the frame for placing the wheels of the motorcycle within, an improved mounting means for securing the motorcycle in an upright position to the frame, comprising:
    a pair of pin means, one fastened to the motorcycle and one fastened to the frame of the trailer;
    a pair of tubes telescoping within each other and engaged together by a threaded bolt carried concentrically within the tubes so that the over-all length varies as one tube is rotated with respect to the other;
    a pair of eyes, each mounted rigidly to the outer end of each tube, each eye containing self-aligning bearings for insertion over one of the pin means; the tubes and eyes extending between the frame of the trailer and the motorcycle; and
    strap means, attached to the frame, for releasably securing the wheels of the motorcycle to the channel members.

4. A utility trailer comprising:
    a pair of longitudinal tubular members spaced apart;
    forward and rearward lateral tubular members connecting the longitudinal tubular members together at each end to define a rectangular frame;
    a pair of first channel members, one member mounted on each longitudinal tubular member with its length parallel with the longitudinal member; the channel of each first channel member facing upward and being sufficiently wide to receive a motorcycle tire;
    a castor wheel assembly mounted to the rearward lateral tubular member intermediate the longitudinal tubular members;
    a pair of hitch means, each attached to the forward end of the frame on opposite sides for releasably connecting the trailer to a vehicle;
    mounting means for releasably securing a motorcycle to the trailer in an upright position; and
    a pair of second channel members for providing wheel stops; each second channel member pivotally connected at one end to and received within one of the first channel members adjacent the forward end of the trailer; each second channel member being flush with the top of the sides of the first channel member while in retracted position.

5. A utility trailer comprising:
    a pair of longitudinal tubular members spaced apart;
    forward and rearward lateral tubular members connecting the longitudinal tubular member together at each end to define a rectangular frame;
    a pair of first channel members, one member mounted on each longitudinal tubular members with its length parallel with the longitudinal member; the channel of each first channel member facing upward and being sufficiently wide to receive a motorcycle tire;

a pair of hitch means, each attached to the forward end of the the frame on opposite sides for releasably connecting the trailer to a vehicle;
mounting means for releasably securing a motorcycle to the trailer in an upright position;
a castor wheel assembly mounted to the rearward lateral tubular member intermediate the longitudinal tubular members, said castor wheel assembly comprising:
a wheel journalled on an axle;
a pair of leaf springs, spaced apart, with the wheel inserted therebetween, each spring perpendicular to and connected at its lower end to the axle;
a cross member connecting the upper ends of the springs together;
a shaft rigidly connected to the cross member perpendicular to it and adapted to extend into a receptacle in the rearward lateral member;
a first flange encircling the shaft and bearing against the rearward lateral member;
a second flange depending downward from the rearward lateral member with an aperture adapted to be aligned directly below the first flange; and
a retaining pin adapted for insertion within the aperture for releasably retaining the castor wheel to the rearward lateral member.

6. The apparatus according to claim 5 wherein the cross member is a tube.

7. A utility trailer comprising:
a pair of longitudinal tubular members spaced apart;
forward and rearward lateral tubular members connecting the longitudinal tubular members together at each end to define a rectangular frame;
a pair of first channel members, one member mounted on each longitudinal tubular member with its length parallel with the longitudinal member; the channel of each first channel member facing upward and being sufficiently wide to receive a motorcycle tire;
a castor wheel assembly mounted to the rearward lateral tubular member intermediate the longitudinal tubular members;
mounting means for releasably securing a motorcycle to the trailer in an upright position; and
a pair of hitch means, each attached to the forward end of the frame on opposite sides for releasably connecting the trailer to a vehicle, comprising:
a first bracket mounted to the forward end of the frame;
a second bracket having a generally L-shaped configuration, with a first coupling member defining one leg of the L and the other leg of the L having a plurality of apertures for releasably coupling the second bracket to the first bracket; the apertures being spaced so that the second bracket may be selectively coupled to the first bracket with the first coupling member in an upper position and in a lower position for varying the height of the hitch for different vehicles;
a second coupling member mounted to the vehicle for engagement with the first coupling member;
the first and second coupling members having apertures therethrough;
pin means for insertion through the apertures in the first and second coupling members when the coupling members are aligned; and
at least one of the first and second coupling members having a notch located on an edge for bearing against the pin means when the pin means is inserted through the aperture of the opposite coupling member prior to coupling the members together, to enable one side of the trailer to be coupled to the vehicle while the other side is held in approximate alignment by the notch.

8. The apparatus according to claim 7
wherein the second coupling member is a single tab, and the first coupling member is a pair of tabs spaced apart, defining a slot for the reception of the second coupling member; and
wherein each tab of the first coupling member has a notch on its upper edge and a notch on its lower edge adjacent the aperture in the tab, for bearing against the pin means when the pin means is inserted through the tab of the second coupling member prior to coupling the members together.

9. A utility trailer comprising:
a pair of longitudinal tubular members spaced apart;
forward and rearward lateral tubular members connecting the longitudinal tubular members together at each end to define a rectangular frame;
a pair of first channel members, one member mounted on each longitudinal tubular member with its length parallel with the longitudinal member; the channel of each first channel member facing upward and being sufficiently wide to receive a motorcycle tire;
a castor wheel assembly mounted to the rearward lateral tubular member intermediate the longitudinal tubular members;
a pair of hitch menas, each attached to the forward end of the frame on opposite sides for releasably connecting the trailer to a vehicle; and
mounting means for releasably securing a motorcycle to the trailer in an upright position, comprising:
a pair of pin means, one fastened to the motorcycle and one fastened to the frame of the trailer;
a pair of tubes telescoping within each other and engaged together by a threaded bolt carried concentrically within the tubes so that the overall length varies as one tube is rotated with respect to the other;
a pair of eyes, each mounted rigidly to the outer end of each tube, each eye containing self-aligning bearings for insertion over one of the pin means; the tubes and eyes extending between the frame of the trailer and the motorcycle; and
strap means, attached to the frame, for releasably securing the wheels of the motorcycle to the channel members.

10. In a utility trailer of the type having a frame, a castor wheel assembly attached to the rear of the frame for supporting the trailer while being towed, and a pair of hitch means mounted to the forward end of the frame adjacent its sides for connection to a vehicle, an improved hitch means comprising:
a first bracket mounted to the forward end of the frame;
a second bracket having a generally L-shaped configuration, with a first coupling member defining one leg of the L and the other leg of the L having a plurality of apertures for releasably coupling the second bracket to the first bracket; the apertures being spaced so that the second bracket may be selectively coupled to the first bracket with the first coupling member in an upper position and in a lower position for varying the height of the hitch for different vehicles;

a second coupling member mounted to the vehicle for engagement with the first coupling member;

at least one of the first and second coupling members having a notch located on an edge for bearing against the pin means when the pin means is inserted through the aperture of the opposite coupling member prior to coupling the members together, to enable one side of the trailer to be coupled to the vehicle while the other side is held in approximate alignment by the notch.

11. In a utility trailer of the type having a frame, a castor wheel assembly attached to the rear of the frame for supporting the trailer while being towed, and a pair of hitch means mounted to the forward end of the frame adjacent its sides for connection to a vehicle, an improved hitch means comprising:

a first bracket mounted to the forward end of the frame;

a second bracket having a generally L shaped configuration, with a first coupling member defining one leg of the L and the other leg of the L having a plurality of apertures for releasably coupling the second bracket to the first bracket; the apertures being spaced so that the second bracket may be selectively coupled to the first bracket with the first coupling member in an upper position and in a lower position for varying the height of the hitch for different vehicles;

a second coupling member mounted to the vehicle for engagement with the first coupling member;

the first and second coupling members having apertures there through;

pin means for insertion through the apertures in the first and second coupling members when the coupling members are aligned;

the second coupling member being a single tab, and the first coupling member being a pair of tabs spaced apart, defining a slot for the reception of the second coupling member; and each tab of the first coupling member having a notch on its upper edge and a notch on its lower edge adjacent the aperture in the tab, for bearing against the pin means when the pin is inserted through the tab of the second coupling member prior to coupling the members together.

* * * * *